United States Statutory Invention Registration [19]

[11] Reg. Number: H19

Carlson [45] Published: Feb. 4, 1986

[54] FUEL INJECTION DEVICE AND METHOD

[75] Inventor: Larry W. Carlson, Oswego, Ill.

[73] Assignee: The United States of America as represented by the United States Department of Energy, Washington, D.C.

[21] Appl. No.: 564,127

[22] Filed: Dec. 21, 1983

[51] Int. Cl.[4] ..... F23D 13/24; F23M 9/00

[52] U.S. Cl. ..... 431/12; 431/182; 431/350; 239/406

[58] Field of Search ..... 110/260, 265; 126/435; 239/405, 406, 424; 431/182, 183, 351, 352, 173

[56] References Cited

U.S. PATENT DOCUMENTS

| | | | |
|---|---|---|---|
| 2,971,480 | 2/1961 | Sage | 110/265 |
| 2,979,000 | 4/1961 | Sifrin et al. | 110/265 |
| 3,199,476 | 8/1965 | Nettel | 110/265 |
| 3,468,487 | 9/1969 | Warren | 239/424 |
| 3,662,547 | 5/1972 | Paine et al. | 239/424 |
| 3,702,175 | 11/1972 | Watkins | 239/424 |
| 3,852,022 | 12/1974 | Medeot et al. | 239/424 |
| 3,896,996 | 7/1975 | Roest | 239/424 |
| 3,927,996 | 12/1975 | Knudsen et al. . | |
| 4,282,010 | 8/1981 | Cherish et al. . | |
| 4,351,632 | 9/1982 | Nagai | 431/183 |
| 4,372,832 | 2/1983 | Bush . | |
| 4,417,692 | 11/1983 | Andrejco et al. | 239/424 |
| 4,422,574 | 12/1983 | Mancuso, Jr. . | |
| 4,428,727 | 1/1984 | Deussner et al. | 431/182 |
| 4,454,865 | 6/1984 | Tammen | 126/435 |

FOREIGN PATENT DOCUMENTS

| | | | |
|---|---|---|---|
| 516069 | 4/1921 | France | 431/183 |
| 1398478 | 12/1965 | France | 239/424 |
| 73331 | 6/1979 | Japan | 431/183 |
| 35885 | 3/1980 | Japan | 431/183 |
| 199120 | 5/1962 | Sweden | 239/424 |
| 731185 | 4/1980 | U.S.S.R. | 431/182 |

*Primary Examiner*—Harold J. Tudor
*Attorney, Agent, or Firm*—Hugh W. Glenn; Robert J. Fisher; Judson R. Hightower

[57] ABSTRACT

A fuel injection system and method provide for shaping a combustion plume within a combustion chamber to effectively recirculate hot combustion gases for stable combustion conditions while providing symmetrical combustion conditions. Char and molten slag are passed to the outer boundary layer to complete combustion of char while permitting initial substoichiometric combustion in a reductive atmosphere for reducing discharge of nitrogen oxides. Shaping of the plume is accomplished by an axially adjustable pintle which permits apportionment of driving pressure between elements which contribute tangential and those which contribute radial directional components to oxidant flow entering the combustion chamber.

15 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FUEL INJECTION DEVICE AND METHOD

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

This invention relates to fuel and oxidant injection into combustion chambers. The invention is particularly applicable for providing hot gas flow for magnetohydrodynamic devices or other applications where it is desirable to provide hot gases substantially free of contaminating slag and other mineral materials. The invention also has application in back-fitting existing combustion units for use with particulate coal or other particulate or highly viscous carbonaceous material. It is contemplated that such feed material can be provided in a liquid or gaseous carrier to the fuel injection system of this invention.

The combustion of carbonaceous material in the form of solid particulates, slurrys of solid particulates or of heavy viscous liquids present considerable problems. Mineral matter within the fuel becomes molten within combustion chambers forming a molten slag that must be removed. Further, in certain applications such as providing hot gases for magnetohydrodynamic (MHD) devices, slag contamination in the electrically conductive seed material prevents its recycle without difficult separation steps. In furnaces and boilers originally designed for light oil or gas use, the close spacing of boiler tubes and other components makes it difficult to subsequently convert to the use of particulate coal or other available fuels. In other instances, particulate carbonaceous material is conveyed in a water slurry requiring the evaporation of the carrier and drying of the fuel within the combustion chamber, which without proper mixing and shaping of the combustion zone can result in quenching or incomplete combustion of fuel materials.

With the recent emphasis on discharge of clean gases from combustion units, the removal of oxides of nitrogen and oxides of sulfur becomes of considerable interest in production processes. Often oxides of nitrogen are minimized through use of a substoichiometric combustion region which establishes a reductive atmosphere for the chemical conversion of organically bound nitrogen in the fuel. Such substoichiometric combustion also contributes to the production of soot having a high carbon content and low porosity. This increases the difficulties in obtaining complete fuel combustion.

In view of the above, it is an object of the present invention to provide an improved fuel injection system for maintaining a stable and symmetrical combustion plume within a combustion chamber.

It is a further object of the invention to provide a fuel and oxidant injection system that permits initial substoichiometric combustion for minimizing oxides of nitrogen emission.

It is also an object to provide a fuel injection system for particulate carbonaceous material that permits adjustment of combustion plume shape within the combustion chamber.

It is one other object of the present invention to provide a method of fuel and oxygen injection that permits good mixing of oxidant and fuel within the combustion chamber and recirculation of hot combustion gases into contact with initially injected gases.

In accordance with the present invention, a fuel injection assembly for use in combination with a combustion chamber is provided. The assembly includes a tubular housing axially mounted onto the combustion chamber. The housing has a throat section near its point of connection with the combustion chamber and accepts an axially adjustable pintle to define an annular chamber therebetween. Axial adjustment of the pintle serves to constrict or enlarge the throat opening into the combustion chamber. The pintle includes an axial passageway for discharging either the fuel or oxidant flows into the combustion chamber. In cooperation with the flow through the pintle, there is provided means for injecting and swirling the second of the oxidant or fuel flows into the annular chamber. The discharges are such as to provide generally concentric impinging flows of fuel and oxidant into the combustion chamber. Adjustment of the pintle respecting the throat section thus constricts or enlarges the opening to shape the combustion region within the chamber.

In more specific aspects of the invention, the carbonaceous fuel is injected in the axial pintle passageway while the oxidant gas is injected through the annular chamber defined between the pintle and tubular chamber.

In further aspects of the invention, a tapered shape is provided inwardly towards the combustion chamber in the throat section and the adjacent mating portion of the pintle resulting in a conical annular passage, whose length and height are variable on axial adjustment of the pintle.

In another specific aspect of the fuel injection assembly, the oxidant swirl means includes a port for admitting oxidant flow into the annular chamber and a ring disposed in the annular chamber between that entry port and the throat section. The ring defines a plurality of passageways through its thickness aligned with both axial and tangential directional components to induce a tangential swirling component to the oxidant flow.

In one other specific aspect, control means are provided for independently varying the oxidant flow to maintain it generally at a constant rate while axially adjusting the pintle.

In other particular aspects, the fuel injection assembly is employed in axial alignment with a combustion chamber at its one end portion. The combustion chamber includes at its opposite end portion an axial opening for discharging combustion gases, a radial opening for discharging molten slag and a generally frustal septum around the axial opening separating it from the radial opening. The combustion chamber may also be connected in communication with an MHD device for the production of electricity or in communication with another utilization device that benefits from generally slag-free combustion gases.

The present invention further contemplates a fuel injection system for the stable combustion of particulate carbonaceous fuels in a combustion chamber from which molten slag is removed. Initial substoichiometric combustion is used to reduce organically bound nitrogen, but yet to minimize soot formation. The system includes means for oxidant injection that provides a flow of oxidant with axial, tangential and radial directional components into the combustion chamber. A pintle is provided for injecting the particulate fuel into the combustion chamber generally concentric within the flow of oxidant.

An important aspect of the invention is the provision of adjustment means for apportioning the driving pressure drop within the oxidant injection means between the tangential directional components and the radial directional components of the oxidant flow. This apportionment permits adjustment of combustion plume shape sufficient to maintain stable combustion while permitting transfer of char and molten slag to the outer boundaries of the plume and generally retaining the combustion gases in the center section of the combustion plume.

In its more specific aspects, the fuel injection system includes a tapered throat section communicating with the combustion chamber and an axially adjustable pintle having a tapered end portion aligned within the tapered throat section such that an annular and generally conical passageway is defined therebetween for oxidant injection into the combustion chamber. This generally conical annular passage provides a radial component to the oxidant injection flow. An axial passageway within the pintle permits the injection of particulate fuel generally concentric within the oxidant flow. Means for swirling the oxidant contributes a tangential directional component such that on axial pintle adjustment an appointment is made of the driving pressure between the tangential and radial directional flow components of the oxidant injection. This permits adjustment of the flow conditions within the combustion plume to provide good mixing of oxidant and fuel as well as proper shaping of the plume in respect to char and slag transfer to the outer boundaries of the combustion chamber.

In yet more specific aspects of the invention, the oxidant flow is provided at 35 to 45% of that required for stoichiometric combustion of the fuel to minimize production of both soot and oxides of nitrogen.

The invention further contemplates a method of injecting oxidant and fuel into a combustion chamber by admitting one of the fluids through an axial passageway of relatively small diameter and the second fluid concentrically around the first fluid. The second fluid includes axial, tangential and radial directional components as it enters the combustion chamber. The shape of the resulting combustion plume within the combustion chamber is varied by apportioning the relative pressure drop between driving pressures providing tangential and driving pressures providing radial flow components within the outer concentric flow. In the specifically contemplated embodiment, the inner fluid is that of particulate carbonaceous fuel material and the outer fluid is an oxidant in a substoichiometric amount respecting the fuel in the concentric flow.

In further aspects of the invention, the relative tangential and radial components of the oxidant flow is varied to effectively shape the combustion plume within the combustion chamber for recirculation of hot combustion gases into contact with the initially injected gases whereby stable and symmetrical combustion dynamics is achieved. In addition, adjustment of these directional components provides for the initial substoichiometric combustion generally near and about the combustion chamber access. It also functions to regulate char transfer to the peripheral boundary of the combustion chamber generally coincidence with the drying and pyrolysis of the carbonaceous particulates.

In other specific aspects, a secondary flow of oxidant is injected tangentially in a direction to supplement the initial tangential directional components. The secondary injection is made at the peripheral boundary of the combustion chamber at no less than 2 and no more than 6 equally spaced locations. This secondary oxidant can be made sufficient to provide stoichiometric and complete combustion of the fuel while driving solid and molten combustion residuals axially along the peripheral boundary layer of the combustion chamber away from the fuel injection point. Molten slag then can be withdrawn from the combustion chamber at the peripheral boundary layer at a location axially removed from the fuel and oxidant injection.

BRIEF DESCRIPTION OF THE DRAWINGS

The present invention is illustrated in the accompanying drawings wherein.

DETAILED DESCRIPTION OF THE PREFERRED EMBODIMENT

Figure 1:
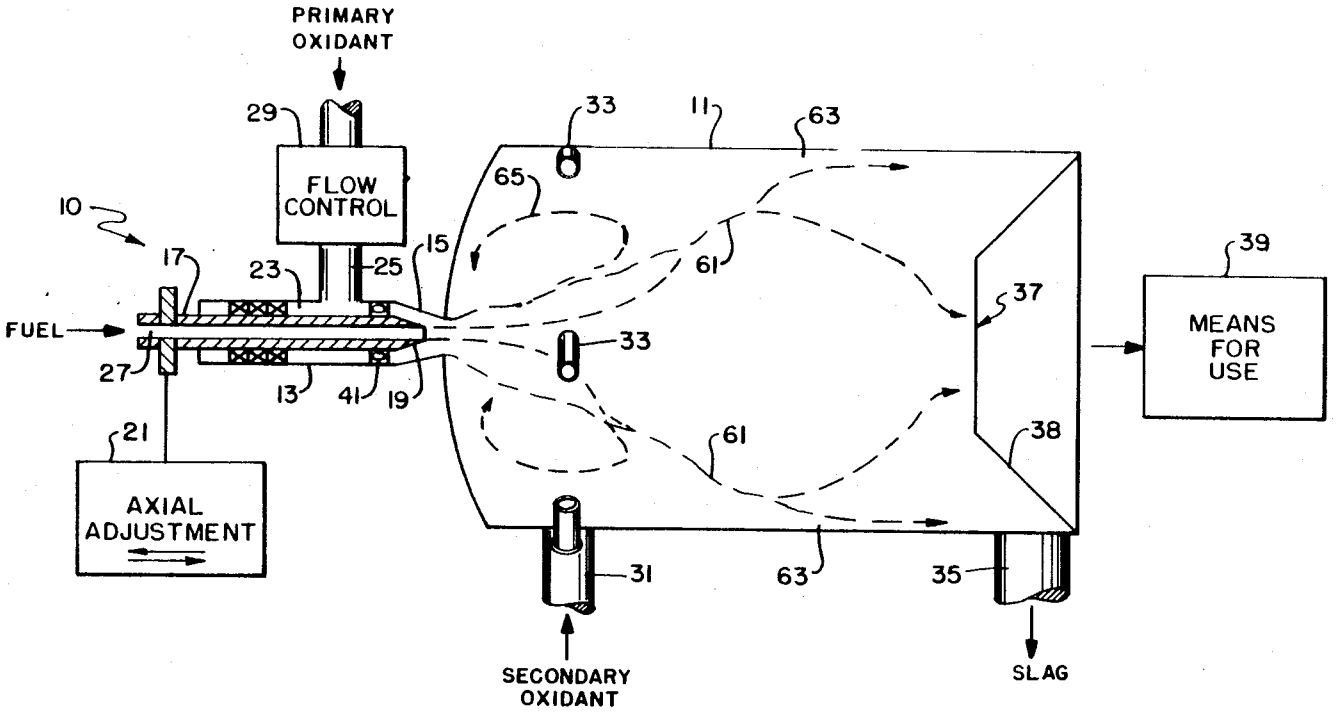
FIG. 1 is a schematic diagram of a fuel injection system.

The Figures illustrate a fuel injection system for use with a combustion chamber 11. The fuel injection assembly 10 includes a tubular housing 13 mounted in communication with the combustion chamber 11. Advantageously the tubular housing is tapered inwardly to form a throat 15 at its proximal end portion communicating with combustion chamber 11. Within the tubular housing 13 is a concentrically disposed pintle 17 which also is illustrated with a tapered end portion 19 corresponding to the tapered throat 15 of the tubular housing. Means for axial adjustment 21 is connected to the pintle such that its tapered end portion 19 can be moved to constrict or enlarge the tapered throat 15 of the tubular housing 13.

An annular chamber 23 is defined between the pintle 17 and the tubular chamber 13 and communicates with the conduit 25 for admitting a flow of primary oxidant. The axial passageway 27 within pintle 17 is supplied with a flow of fuel for combustion with the primary oxidant in chamber 11. An independent flow control 29 is included within the flow of primary oxidant such that a generally constant flow of oxidant can be maintained while axial adjustments are made to pintle 17.

Swirl member 41 is illustrated of ring shape positioned within annular chamber 23 to receive all of the flow of primary oxidant. The primary oxidant entering through conduit 25 is given a tangential velocity component on passing through axially transverse passageway 43 (FIGS. 2 and 2A) within swirl member 41. An additional or secondary oxidant is introduced into combustion chamber 11 through conduit 31 which is advantageously manifolded into a plurality of tangential entrys 33 around the circumference of combustion chamber 11.

Conduit 35 for slag discharge communicates in generally radial alignment with the end of combustion chamber 11 opposite to the fuel injection assembly 10. In axial alignment with combustion chamber 11 is shown a frustal shaped septum 38 for separating the combustion gases towards central opening 37 away from the molten slag discharge at 35.

The hot combustion gases can be passed on to a means for their use 39 such as a turbine, steam generator or advantageously a magnetohydrodynamic (MHD) device for direct conversion of heat energy to electricity. As will be seen, the system and method of the present invention provides a flow of hot combustion gases substantially free of slag contamination such that their use in a MHD device can be carried out with minimal risk of contamination of the electrically conductive seed material. In addition, steam generators with closely spaced boiler tubes can advantageously employ gases from the combustion system described herein, as fouling of such tubes will be minimized. This is of particular importance in the retrofitting of combustors for boilers previously designed for the combustion of light oils and natural gases from which contamination by molten slag and other mineral matter generally was not considered a serious problem.

Figure 2:
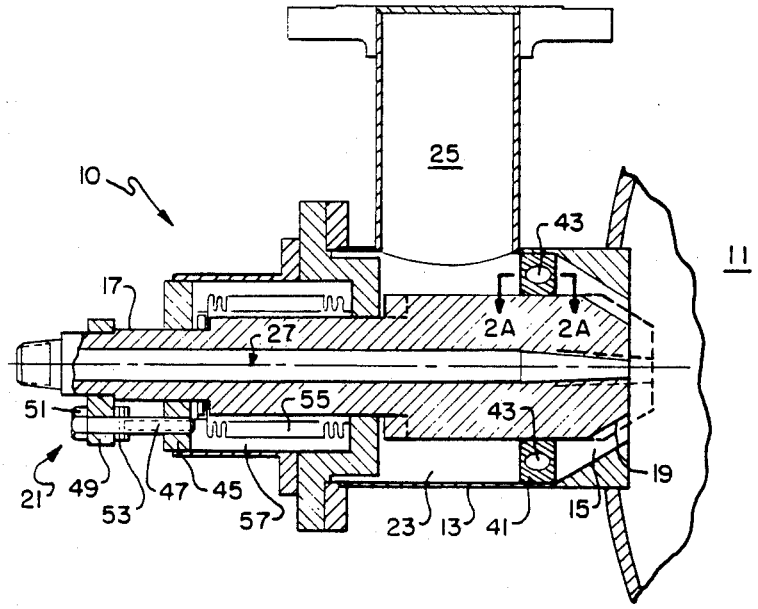
FIG. 2 is a cross-sectional view of a fuel injection assembly.
Figure 2A:
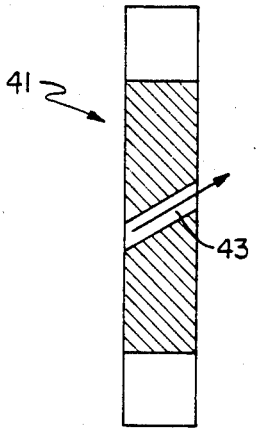
FIGS. 2A is a cross-sectional view taken at A—A of a single component of the fuel injection assembly of FIG. 2.

In FIG. 2, additional details of swirl member 41 and other detailed aspects of a fuel injection assembly 10 are presented. As shown, member 41 is of ring shape placed within annular passage 23 between the connection of conduit 25 and the tapered portions 19 and 15 of the pintle and throat section. A plurality of axially transverse passageways 43 of generally tubular shape are illustrated through the ring width. Passageways 43 are aligned to have both axial and tangential directional components such that primary oxidant passing through these passageways are given a swirling motion as they enter the throat section 15 of tubular member 13.

Although one form of swirl member 41 is illustrated in the drawings, it will be appreciated that various configurations of openings, slots, vanes, channels, and other members align to present passageways with axial and tangential directional components can be provided in accordance with the present invention.

Means for axial adjustment of pintle 17 can be provided in various mechanical, hydraulic or pneumatic forms. The embodiment illustrated in FIG. 2 includes end plate 45 receiving threaded bolt 47 which slidably engages retaining flange 49 affixed to pintle 17. Through adjustment and positioning of locking and retaining nuts 51 and 53, the axial position of pintle 17 can be varied. Bellow seal 55 illustrated within stuffing box 57 is provided in the distal end of tubular member 13 for sealing annular passage 23 to accomodate the axial adjustment of pintle 17.

In one method of performing the method of the present invention, fuel is injected into the axial passageway 27 of pintle 17 for introduction into combustion chamber 11. A concentric flow of primary oxidant is introduced through conduit 25 into the annular passageway 23 around the pintle 17 and subsequently, concentrically around the fuel flow. The flow of primary oxidant is provided with a tangential or swirling motion on passage through the transverse axial passageways 43 of member 41. A radial flow component is given to the primary oxidant as it passes through the inwardly tapered throat section 15 of tubular member 13 and enters combustion chamber 11.

The inward radial flow of the oxidant begins the mixing of fuel and oxidant within the core flow entering the combustion chamber. The swirling or tangential component of the oxidant flow in combination with the expansion resulting from combustion generates a combustion plume as illustrated at 61. The plume flares or bushes out towards the peripheral boundaries 63 of the combusion chamber.

The shape of the combustion plume 61 is of considerable interest in the efficient operation of the combustion chamber. The adjustable fuel injection assembly permits the axial positioning of pintle 17 and its tapered end portion 19 to enlarge or to constrict throat 15 of the opening into combustion chamber 11. One ilustration of this adjustment is shown in phantom in FIG. 2 with the pintle 17 thrust inwardly to substantially narrow the conical passage through throat 15.

This narrowing of the conical passage apportions substantially more of the oxidant pressure drop to the constricted throat as opposed to the passageways 43 through swirl member 41. As a result of this shift in pressure drop, the relative tangential directional component of the oxidant flow is reduced in favor of the radial component. Thus the combustion plume 61 will be thinner with less flaring or bushing towards the peripheral boundaries 63. Conversely on enlarging conical passage 16, pressure drop is shifted to swirl member 41 to increase the tangential directional component in the oxidant flow with accompanying flare and expansion of the combustion plume 61. Additional adjustment in the amount of swirling action within combustion chamber 11 can be provided through variation of the tangential flow of secondary oxidant at entrys 33.

Combustion plume 61 is accordingly adjusted to give effective amounts of recirculating hot gases 65 to maintain stable combustion, to provide sufficient dwell time of char particles within the combustion chamber for complete combustion, and to transfer char to the combustion chamber outer boundary 63 generally when pyrolysis and drying is complete. Where throat section 15 is constricted so much as to greatly reduce the total flow, flow control 29 of the primary oxidant is varied to provide a generally constant flow condition.

Various modifications are contemplated in respect to the specific method and structure described herein. For instance, with appropriate design changes the fuel and oxidant flow can be exchanged with oxidant entering the pintle passageway 27 and fuel entering the annular passage 23. The oxidant and fuel reactants can be liquid, gaseous, entrained solids in slurry or gaseous flow. Ordinarily, it is contemplated that a gaseous oxidant such as oxygen or air in combination with an entrained flow of particulate carbonaceous fuel will be selected. Also, it is clear from the above description that varous means for swirling the oxidant gas, including for instance variable pitch vanes, are contemplated to accomplish variation in the tangential flow of oxidant.

It will be clear from the above description that a fuel injection assembly and method is provided to effectively shape the combustion plume of solid carbonaceous material to provide symmetrical and stable flow dynamics within a combustion chamber. Hot combustion gases are made to recirculate into mixture with entering fuel and oxidant while char and slag are passed to the outer combustion chamber boundaries. The char can be transferred to the outer boundaries as it drys and pyrolizes but can be provided with sufficient dwell time in the chamber for complete combustion through plume shape adjustment. Also substoichiometric combustion can be achieved to lower emission of $NO_x$ gases while providing adjustment to minimize soot production.

Although the invention is described in terms of specific materials, structures, and method steps, it will be clear to one skilled in the art that various modifications can be made within the scope of the appended claims.

The embodiments of this invention in which an exclusive property or privilege is claimed are defined as follows:

1. A fuel injection assembly for use in combination with a combustion chamber comprising:

a tubular housing axially mounted to communicate with said combustion chamber, said housing having a tapered throat section at its proximal portion communicating with said chamber;

an axially adjustable pintle in said tubular housing defining an annular chamber therebetween outwardly from said throat section, said pintle axially adjustable to constrict or enlarge the opening of said throat section, said pintle having an axial passageway;

means for injecting a particulate fuel into said axial passageway of said pintle towards said combustion chamber;

means for injecting and swirling a gaseous oxidant, reactive with said particulate fuel, around said pintle within said annular chamber into said throat section such that generally concentric discharge of fuel and oxidant is made into said combustion chamber; and means connected to said pintle for axial adjustment thereof respecting said throat section during injection of said fuel and oxidant to vary the combustion plume shape within the combustion chamber.

2. The fuel injection assembly of claim 1 wherein said throat section and adjacent pintle end portion each being correspondingly tapered inwardly towards said combustion chamber to define a generally conical annular passage of variable length and height with axial adjustment of said pintle respecting said throat section.

3. The fuel injection assembly of claim 1 wherein said swirl means comprises, a port for entry of said second fluid into said annular chamber, a ring disposed in said annular chamber between said entry port and said throat section, said ring including a plurality of transverse axial passageways aligned through the thickness thereof with axial and tangential directional components to provide a tangential swirling flow component to second fluid passing therethrough.

4. The fuel injection assembly of claim 3 wherein there is provided means for independently controlling oxidant flow connected to said tubular housing at a location to be in sequential flow communication with the annular chamber, tapered throat section and combustion chamber.

5. The fuel injection assembly of claim 1 axially aligned with said combustion chamber at one end portion thereof, said combustion chamber being of cylindrical shape and including at least two tangential entries at equally spaced circumferential locations for secondary oxidant injection, an axial opening at its opposite end portion for discharging combustion gases, a radial opening for discharging a slag and a generally frustal septum around said axial opening separating it from said radial opening.

6. A particulate fuel and gaseous oxidant combustion system comprising a combustion chamber, a tubular housing axially mounted into one end wall of said combustion chamber, means for injecting oxidant flow into said tubular housing, said tubular housing having an inwardly tapered throat section communicating with said combustion chamber to impart a radial directional component to oxidant flow, an axially adjustable pintle concentric within said tubular housing to define an annular passage with an opening into said combustion chamber, said pintle having an axial passageway for a fluidized flow of particulate fuel and an inwardly tapered end portion aligned with the tapered throat section of said housing, swirl means within said annular passage for contributing a tangential directional component to oxidant flow therein, means for axially adjusting said pintle during combustion of particulate fuel with gaseous oxidant to constrict or enlarge the opening of the annular passage into the combustion chamber and thereby apportion oxidant pressure drop between tangential and radial direction flow components.

7. The system of claim 6 wherein said combustion chamber is of cylindrical shape and is provided with at least two equally spaced, tangential entries for secondary oxidant injection at its cylindrical boundary.

8. The system of claim 6 wherein said means for injecting oxidant flow includes means for controlling the flow of oxidant independent of the axial adjustment of said pintle.

9. A method of injecting oxidant and fuel into a combustion chamber comprising:

injecting a first fluid selected from the group consisting of oxidant or fuel through an axial passageway of relative small diameter respecting said combustion chamber, axially injecting a second fluid selected from the group consisting of oxidant and fuel other than the selected first fluid, concentrically around said first fluid, said second fluid having axial, tangential and radial directional components, and apportioning the relative driving pressure between that providing tangential and that providing radial flow components to said second fluid to effectively shape the combustion plume within said combustion chamber.

10. The method of claim 9 wherein said first fluid is a fuel of particulate carbonaceous material and said second fluid is an oxidant gas provided in substoichiometric amounts respecting said fuel.

11. The method of claim 9 wherein said plume is effectively shaped to provide the recirculation of hot combustion gases into contact with injection gases and to provide for stable symmetrical combustion dynamics in said chamber.

12. The method of claim 9 wherein said plume is effectively shaped to provide for initial combustion generally near and about the axis of said chamber and to transfer char to the peripheral boundary of said chamber generally as drying and pyrolysis of said carbonaceous particulate fuel is complete.

13. The method of claim 9 wherein a secondary oxidant is injected tangentially, supplementing the tangential directional components of said axial injection, said secondary injection is made at the peripheral boundary of said combustion chamber at no less than 2 and no more than 6 equally spaced locations.

14. The method of claim 13 wherein said secondary oxidant is sufficient to provide stoichiometric amounts for combustion of said fuel and sufficient to drive solid and molten combustion residuals axially along the peripheral boundary layer of said combustion chamber away from said fuel injection point.

15. The method of claim 14 wherein molten slag is withdrawn at the peripheral boundary layer at the axially opposite end portion of said combustion chamber from said fuel injection.

* * * * *